Apr. 17, 1923.

J. C. THOUVIOT 1,452,449

APPARATUS FOR HEAPING OR PILING UP PACKAGES, BAGS, AND THE LIKE

Filed July 2, 1920   4 Sheets-Sheet 1

INVENTOR
JEAN CLAUDE THOUVIOT
BY
ATTORNEYS

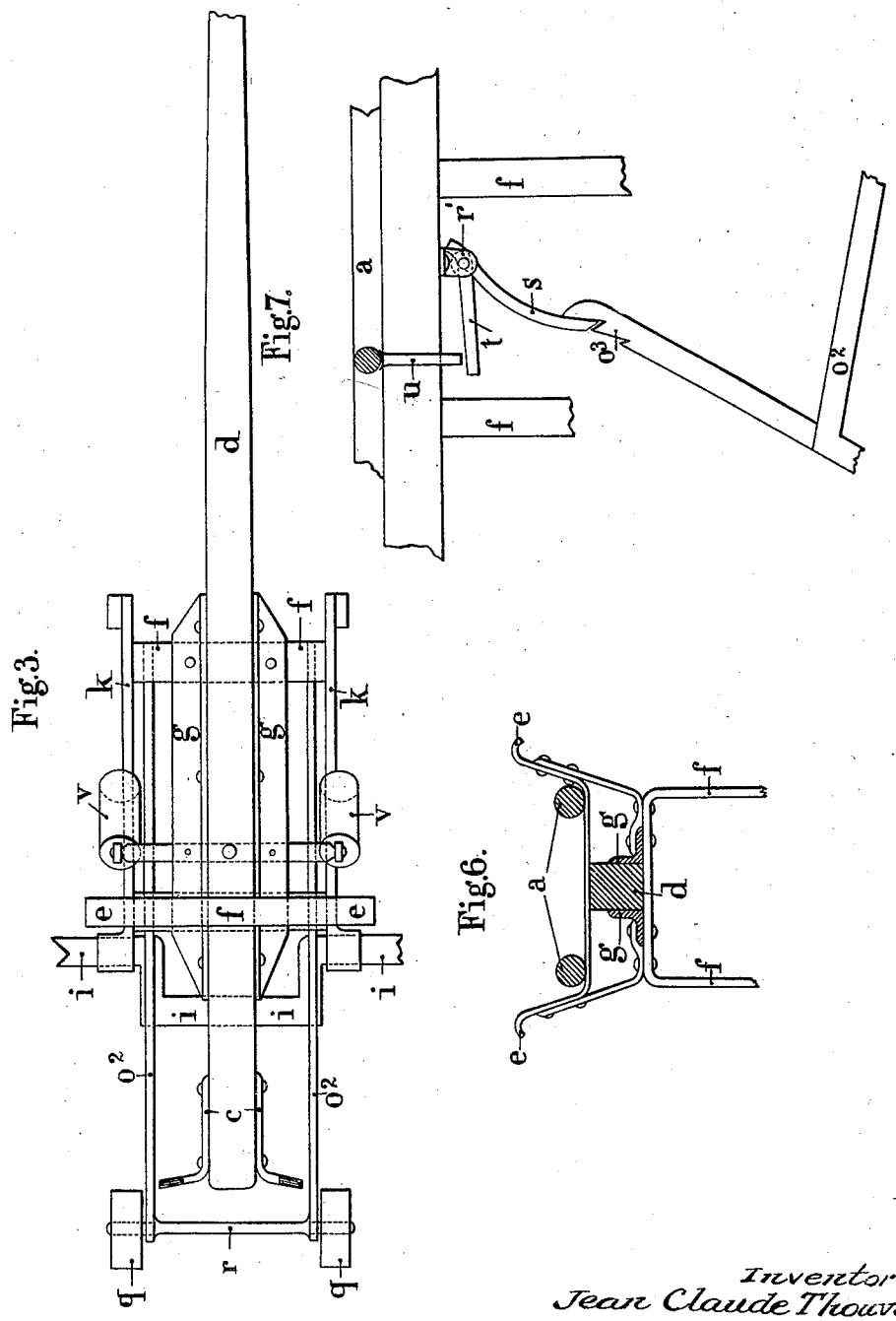

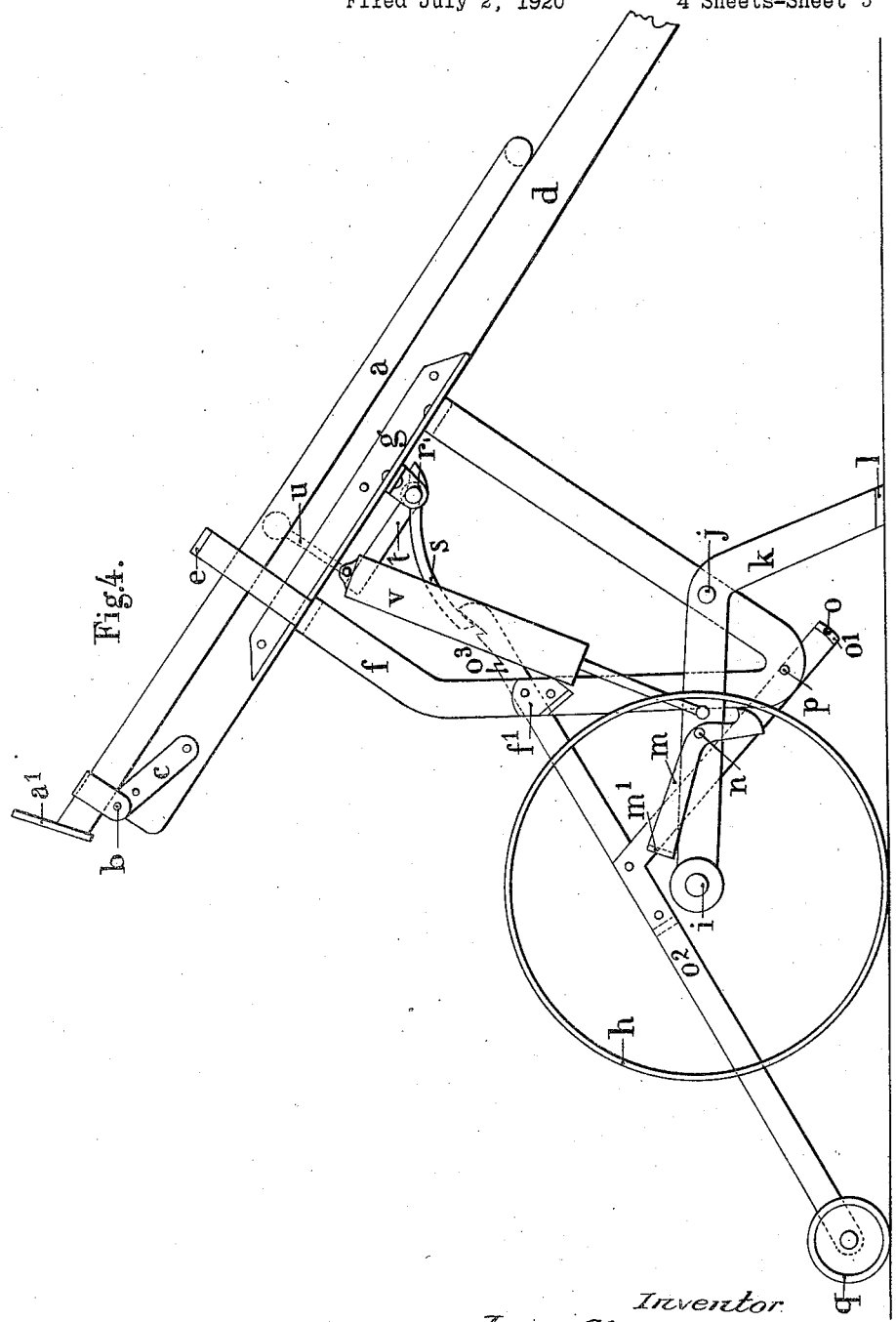

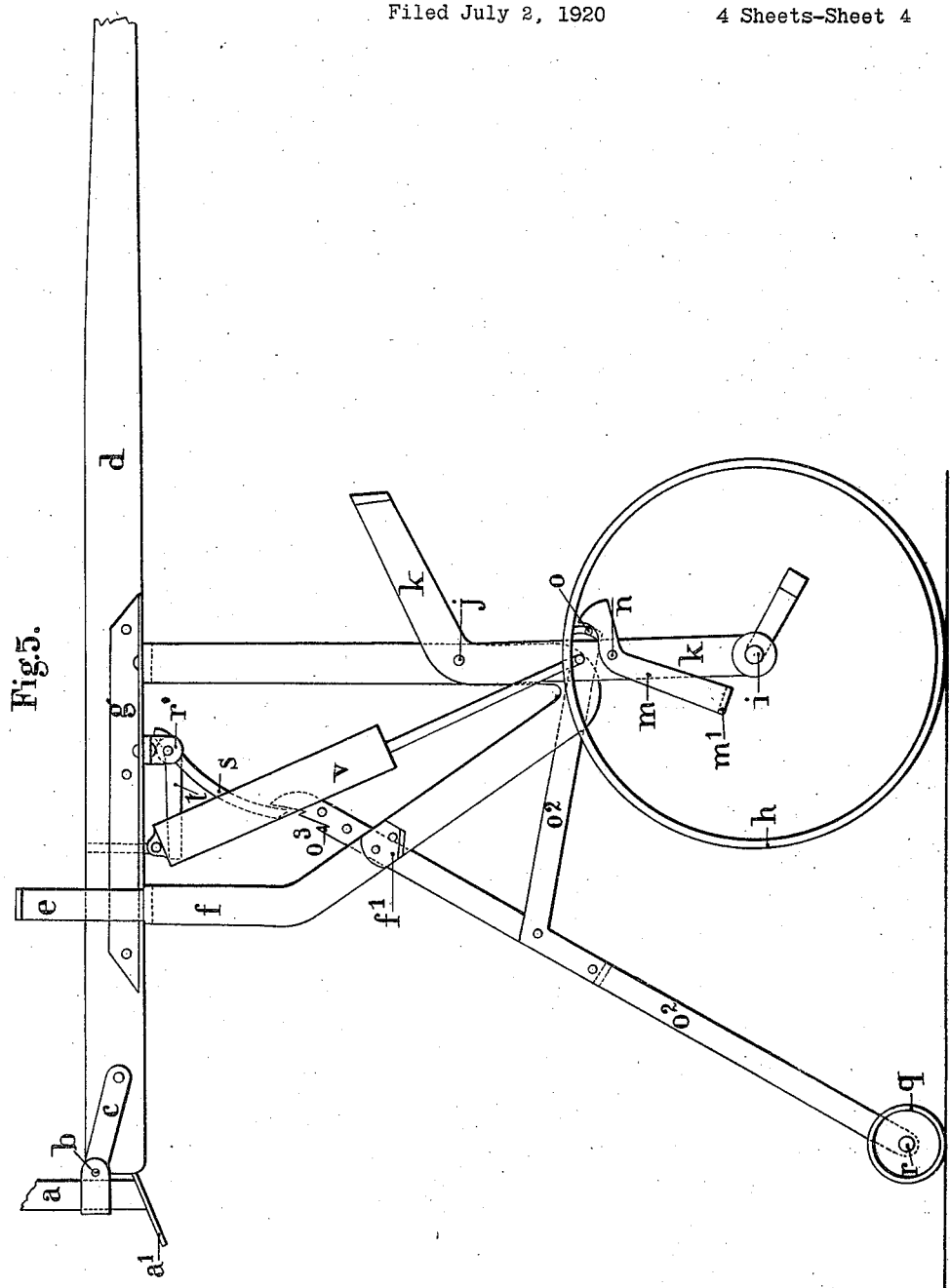

Patented Apr. 17, 1923.

1,452,449

UNITED STATES PATENT OFFICE.

JEAN CLAUDE THOUVIOT, OF PARIS-L'HOPITAL, FRANCE.

APPARATUS FOR HEAPING OR PILING UP PACKAGES, BAGS, AND THE LIKE.

Application filed July 2, 1920. Serial No. 393,499.

*To all whom it may concern:*

Be it known that I, JEAN CLAUDE THOUVIOT, of Paris-L'Hopital, Saone and Loire, France, have invented an Apparatus for Heaping or Piling Up Packages, Bags, and the like, of which the following is a full, clear, and exact description.

This invention has for its object an apparatus for heaping and piling up packages, bags and the like.

This apparatus has been devised in view of:

1. Taking the packages on the ground or on a floor for displacing them;

2. Setting down the displaced packages either on the ground or on a floor or heaping or piling them on other packages either on a platform erected above the ground or floor.

The various parts, devised in a special way, are arranged and combined in such a manner that the whole of the apparatus may be lowered, then raised on the wheels and on the prop, pushed and finally lowered, so as to take the package, carry it and set it down at the required place.

This invention will be described, by way of example, in the accompanying drawing, in which:

Fig. 3 is another plan view of the apparatus but without the upper plate.

Fig. 4 is a side elevation of the apparatus in the first phase of the raising movement on the wheels and on the prop.

Fig. 5 shows in side elevation the apparatus completely raised.

Fig. 6 shows a detail in cross vertical section on line 6—6 of Fig. 1.

Fig. 7 shows a part in elevation a locking device operating when the apparatus is loaded.

Figure 1:
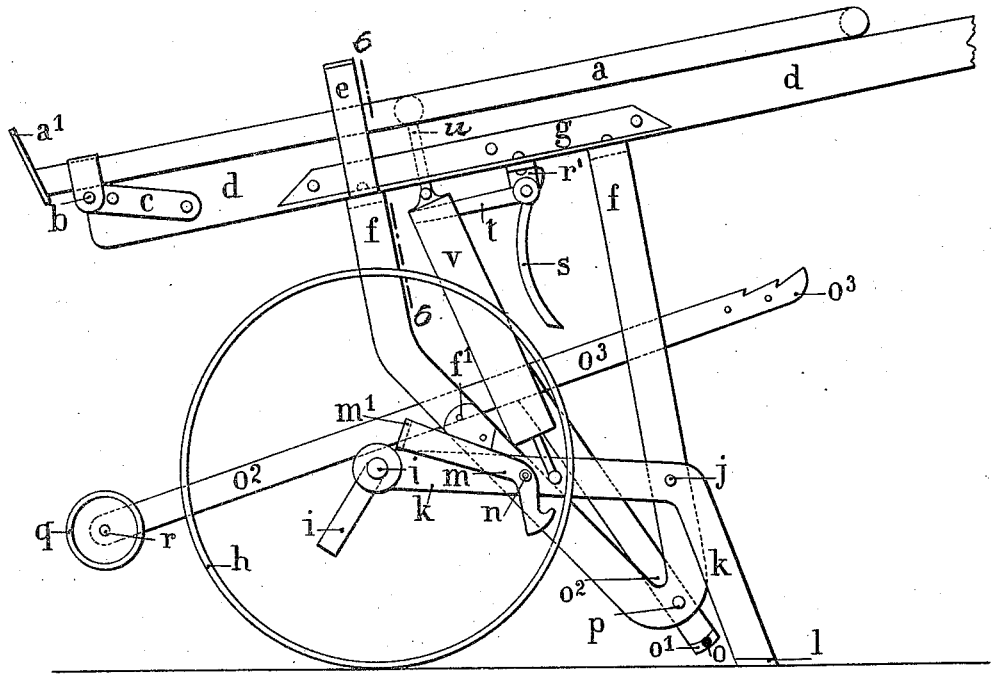
Figure 1 is a side elevation of the apparatus, the prop being folded back.
Figure 2:
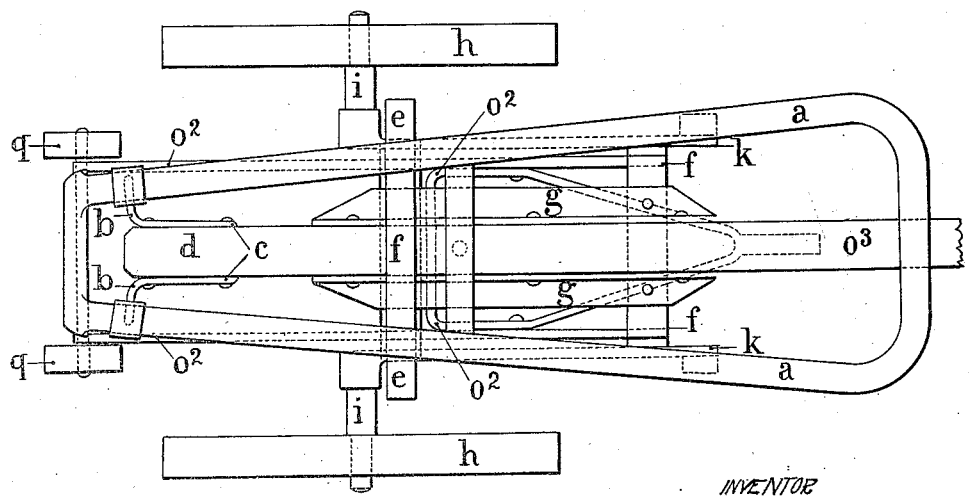
Fig. 2 is a plan view of the said apparatus.

As illustrated in the drawing, this apparatus comprises a frame $a$ connected by a pivot $b$ and bars $c$ to the pole $d$. This frame rests, on the one hand, on the pole and, on the other hand, on a cross bar $e$ the bent up ends of which serve as a guide for the said frame.

The pole $d$ is connected to the frame $f$ of the apparatus by two angle-irons $g$.

The frame $f$ is mounted on two wheels $h$ arranged at the ends of a bent axle $i$. These wheels can take various positions relatively to the frame $f$ as will be seen hereafter.

On each side of the frame $f$ is pivoted at $j$, an arm $k$ serving as a support for the axle $i$ of the wheels, this arm $k$ being suitably bent for resting on the ground at $l$.

The arms $k$ each carry a hook $m$ pivoted at $n$ and capable of coming in engagement with a claw $o$ arranged on the end $o^1$ bent at right angles of the prop $o^2$.

The hook $m$ is adapted to release the claw $o$ of the prop at the proper time, whilst being held stationary by its heel piece $m^1$.

The prop $o^2$ pivoting on the frame $f$ at $p$ and bent, extends forwardly towards the ground and terminates by rollers $q$. This prop is constituted by two metal bars connected together: 1. by a cross-bar $r$ serving as an axle for the rollers: 2. by a metal bar forming a central rack $o^3$.

On each of the branches of the frame $f$ is secured a tappet $f^1$ adapted to hold the frame raised above the arms $k$.

Under the angle-irons $g$ secured to the pole $d$ is arranged a lug $r^1$ provided with a pawl $s$ and a lever $t$ the function of which will be indicated hereafter.

In the pole $d$ is arranged a rod $u$, Fig. 7, the function of which will also be indicated hereafter.

The apparatus comprises also, optionally, two pneumatic shock-absorbers $v$ acting as a brake and pivoting respectively, on the one hand, on the arms $k$ and, on the other hand, on the angle-irons $g$.

Supposing the apparatus is in the position it occupies Fig. 1, if a bag is to be taken from the ground and placed on another bag, the operations is as follows:

First movement—(a) Raise the free end of the pole $d$ and introduce the member $a^1$ of the frame arranged vertically under the bag to be displaced; (b) cause this bag to bear against the frame $a$, then press upon the end of the pole $d$ so that the latter comes back to the position it occupies Fig. 1, without however allowing the arms $k$ to touch the ground at $l$; (c) then lead the loaded apparatus opposite the bag already in position.

Second movement—Press upon the free end of the pole $d$ until the pawl $s$ engages with the rack $o^3$, Fig. 4. In this movement, the wheels $h$ and the arms $k$ remain in contact with the ground; the rollers $q$ also rest on the ground.

Third movement—Raise up to the horizontal the free end of the pole $d$, so that the apparatus takes a bearing on the rollers $q$; then the arms $k$ pivot and actuated by the wheels, finally stop against the bent end of the prop $o^2$, whilst the hooks $m$ engage with the claws $o$, so that the arms $k$ are thus held stationary as indicated in Fig. 5.

Fourth movement—Raise the frame $a$, as shown in Fig. 5, by taking it with the hand by its rear end, the bag to be piled up then comes of itself vertically on the bag already in position.

The operation being terminated, for bringing back the apparatus in the position it occupies in Fig. 1, it suffices to fold down the frame $a$ on the pole $d$ and to press upon the end of the latter; the rollers $q$ of the prop remain in contact with the ground, and the pawl $s$ releases itself from the rack $o^3$. At this moment, the claws $o$ leave the hooks $m$. In these conditions, the prop being no longer retained, pivots on its pivot pin $p$ and by reason of its own weight, the apparatus automatically takes back its initial position as indicated in Fig. 1.

In order to avoid a too sudden collapsing on the arms $k$ and to prevent the shock which may result therefrom, these arms are subjected to the action of two pneumatic shock absorbers $v$ acting as a brake.

For avoiding the accidental disengagement of the pawl $s$, when the apparatus is loaded, the frame $a$ being folded down, this pawl $s$ is held stationary by the rod $u$, Fig. 7, through the medium of the lever $t$. Under the weight of the bag resting on the frame $a$, the rod $u$ is itself held stationary, so that the pawl $s$ cannot be disengaged from the rack $o^3$ as long as the bag is not discharged and this rod released.

As above stated, this apparatus may also serve for transporting and discharging packages without heaping or piling them up. Thus for instance, the apparatus being loaded and in the position it occupies Fig. 1, for unloading the same it suffices to raise the frame $a$ by its rear end and the package is vertically deposited on the ground.

The forms, details, accessories, materials and dimensions of this apparatus may of course be varied without departing thereby from the spirit of the invention.

Claims—

1. An apparatus for heaping or piling up packages, bags and the like, comprising a pole, a pivoted frame $a$ on the pole, a frame $f$, arms $k$ pivoted to the frame $f$, an axle $i$ mounted in the arms, wheels $h$ on the axle, a prop $o$ pivoted to the frame $f$ and having a rack $e^3$ at one end, rollers $q$ mounted in the other end of the prop, a retaining pawl $s$ on the frame for engaging the rack of the prop, and hooks $m$ on the prop for engaging the arms $k$ to maintain the axle of the wheels in fixed position.

2. In an apparatus for heaping or piling up packages, bags and the like, a pole, an axle, wheels on the axle, arms having one end secured to the axle and their other ends adapted to rest on the ground, a frame depending from the pole and pivoted to the arms, a prop having intermediate of its ends a member pivoted to the frame, detachable engaging means between the upper end of the prop and the frame, and means for locking the member of the prop to the said arms.

3. In an apparatus for heaping or piling up packages, bags and the like, a pole, a frame depending from the pole, an axle, wheels on the axle, arms having one end secured to the axle and their other ends bent to rest upon the ground and to which arms the frame is pivoted, a prop having intermediate of its ends connected arms pivoted to the frame below the pivotal connection of the frame with said arms, the upper end of the prop being provided with a rack, a pawl mounted on the frame and adapted to engage the rack of the pole, and a pivoted hook on the said arms and having a locking engagement with the arms of the pole.

4. In an apparatus for heaping or piling up packages, bags and the like, a pole, a frame depending from the pole, an axle, wheels on the axle, arms having one end secured to the axle, and the other end bent to rest upon the ground, the frame being pivoted to the arms, a prop having at one end a rack, and at its other end rollers, arms secured to the prop intermediate of its ends and having at their ends a connecting member, said arms being pivoted to the lower end of the frame, a pawl mounted on the frame and adapted to engage the rack of the prop, means for locking the pawl in engagement with the rack, a hook pivoted to the arms secured to the axle, and a member on the connecting member of the arms of the prop and with which said hook is adapted to engage.

5. In an apparatus for heaping or piling up packages, bags and the like, an axle, wheels on the axle, arms secured to the axle and having angular ends adapted to rest on the ground, a frame pivoted to the arms a distance from its lower end, a prop pivotally connected with the lower end of the frame, interengaging means between the upper end of the prop and frame, and means for locking the said arms to the prop.

6. In an apparatus for heaping or piling up packages, bags and the like, an axle, wheels on the axle, arms in one end of which the axle is mounted, a frame pivoted to the arms, a prop pivotally connected with the said frame, means for locking the prop to the arms and interengaging means between the upper end of the prop and the frame.

7. In an apparatus for heaping or piling up packages, bags and the like, an axle, wheels on the axle, arms in one end of which the axle is mounted the other end of the arms being bent and adapted to rest upon the ground, a frame pivoted to the said arms, and a prop having pivotal and locking connection with the frame and locking connection with the arms.

8. In an apparatus for heaping or piling up packages, bags and the like, an axle, wheels on the axle, arms in one end of which the axle is mounted, the other end of the arms being adapted to rest on the ground, a frame pivoted at a distance from its lower end to the arms, whereby the arms can be swung into vertical position with the wheels below the lower end of the frame and the frame thereby elevated, and means for holding the parts in said positions.

The foregoing specification of my apparatus for heaping or piling up packages, bags and the like signed by me this 7th day of June 1920.

JEAN CLAUDE THOUVIOT.